United States Patent Office 3,051,122
Patented Aug. 28, 1962

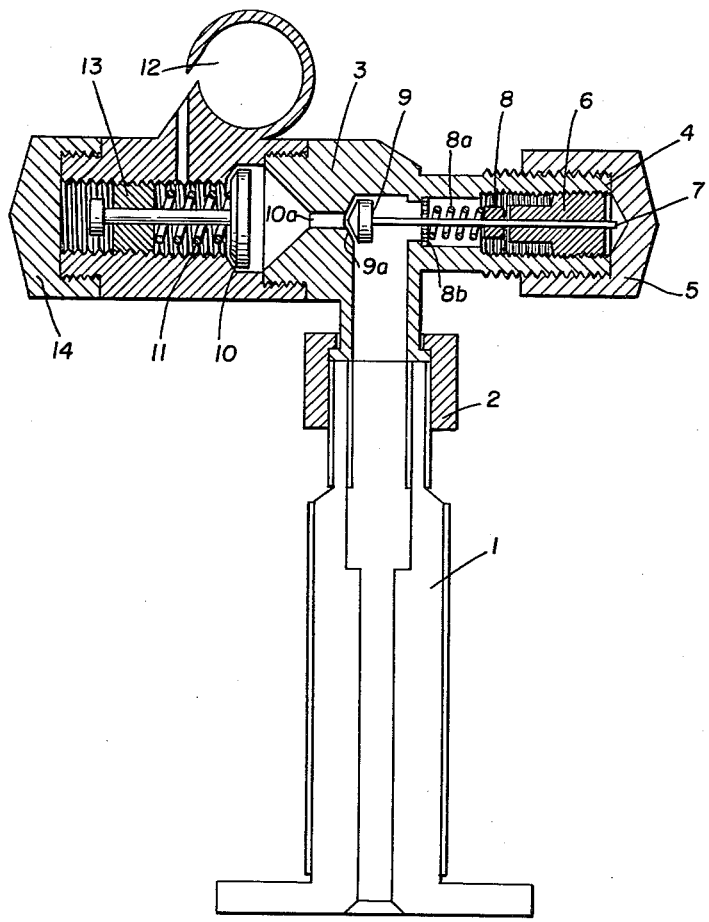

3,051,122
PRESSURE-MONITORING DEVICE, PARTICULARLY FOR MOTOR VEHICLE PNEUMATIC TIRES, COMPRESSED AIR PIPES FOR BRAKES, TANKS AND THE LIKE
Settimio Gorini, Rome, Italy, assignor to Edoardo Gabriele, Schenectady, N.Y.
Filed Feb. 16, 1959, Ser. No. 793,408
4 Claims. (Cl. 116—34)

It is an object of the present invention to provide a simple, practical and relatively cheap pressure-monitoring device which can be fitted to a valve of an ordinary pneumatic tire and such that as soon as the pressure falls below a pre-established level an acoustic or electric warning device comes into operation. In this way, in the case of a pneumatic tire, the driver, even if he is not at the moment in a position to change the wheel or re-inflate the tire, is at least warned, so that he can act accordingly, reducing his speed on turns or curves and driving with greater caution when overtaking another vehicle. The invention may also be connected at an appropriate place, into a pneumatic brake system where it will act to afford a warning of dangerously low fluid pressure therein.

According to a first embodiment, the pressure-monitoring according to the invention consists essentially of a cap to be fixed over the mouth of a valve of a pneumatic tire in pressure-tight relation therewith, together with a valve controlled by a spring which is calibrated to a pressure slightly less than that prescribed for the inner tube or the pipe so that when the pressure therein falls below that for which the spring has been calibrated the valve opens and the air which it allows to escape directly operates an acoustic warning device, for example a whistle.

According to another embodiment, the valve of the device, being displaced as aforesaid owing to the lowering of the pressure, closes an electric circuit.

The accompanying drawings illustrate, by way of non-limitative example, two preferred embodiments of a device according to the invention. In the drawings:

FIGURE 1 shows in longitudinal section a pressure-monitoring device and, integral therewith, an accoustic warning device constituted by a whistle.

In FIGURE 1, the reference numeral 1 indicates a motor vehicle tire valve housing to which there has been fitted by means of a ring nut 2 an embodiment of the invention assembled in a single body 3. Inflation of the tire is carried out through a nozzle 4 which is normally covered by a screw cap 5. Into nozzle 4 there is screwed a sleeve 6 in which slides value means comprising a pin 7 carrying an inflation valve body or closure element 8, which bears against the sleeve 6, and a valve body or closure element 9 which closes a passage to a whistle during the inflation stage.

While the tire is being inflated, valve body 8 and pin 7 on which it is mounted, are forced to the left as the parts are viewed upon FIGURE 1, against the urge of a valve spring 8a which bears on body 8 at one end and a perforated abutment element 8b at its other end; and valve body 9 is moved onto its seat 9a to close passage 10a to the whistle.

When the tire is inflated, valve 8, under the urge of spring 8a, bears against sleeve 6 to close the air inlet, while valve 9 opens passage to the whistle. Owing to the air pressure which then prevails in the passage, valve means or body 10 is then urged to the left as the parts are viewed upon FIGURE 1, and compresses spring 11, thus, preventing air flowing to whistle 12.

The pressure exerted by spring 11 on valve body 10 can be adjusted by means of a bushing 13, which is preferably threadedly mounted in body 3 and to which access is obtained by unscrewing a cap 14 which normally closes the end of body 3.

When pressure in the tire falls below a value determined by the axially-adjusted position of bushing 13 and corresponding compression of spring 11, the spring opens valve 10 and allows air to escape through and operate whistle 12.

While I have disclosed the invention in a form presently preferred by me, various changes in shape and size, as well as substitutions of equivalents will occur to those skilled in the art, after a study of the foregoing description. Hence the disclosure should be taken in an illustrative, rather than a limiting sense; and it is my desire and intention to reserve all modifications within the scope of the subjoined claims.

Having fully disclosed the invention, what I claim and desire to secure by Letters Patent is:

1. In a device for signaling drop of pressure to a predetermined value in a pressure vessel, a valve body having a chamber, inlet and outlet connections to said chamber, said body having an exhaust passage from said chamber to outside air, signal means fixed with said body and operated by escape of pressure fluid from said passage, valve means in said body closable to cut off said passage in response to predetermined high pressure in said chamber, spring means in said body urging said valve means to open position, and a valve in said chamber including interconnected first and second closure elements movable to close said inlet and said passage respectively, said first element being in position closing said inlet when said second element is in position opening said passage, and vice versa, and means urging said valve into position closing said inlet.

2. A device as in claim 1, said valve comprising a pin reciprocably mounted in said chamber, said first and second closure elements being fixed with said pin and movable as a unit therewith.

3. A device as in claim 1, and means carried by said body and manually adjustable with respect thereto, to vary the tension of said spring means and correspondingly vary said predetermined high pressure.

4. A device for attachment to a pressure vessel to signal a predetermined low pressure therein, comprising, an elongated tubular valve body having axially-spaced first and second chambers therein and an axial passageway connecting said chambers, an inlet connection with said first chamber at one end of said body, an outlet connection with said first chamber radially disposed with respect to, and intermediate the ends of said tubular valve body, a first valve in said first chamber comprising a pin axially disposed with respect to said valve body and having first and second valve closure elements fixed therewith, said pin being axially reciprocable between a first position wherein it moves said first and second elements to close said inlet and open said passageway, respectively, and a second position wherein it opens said inlet and closes said passageway, means urging said pin into first position, an exhaust conduit in said valve body from said second chamber to outside air, signal means fixed with said valve body and operated by and in response to escape of pressure fluid from said conduit, a second valve in said second chamber reciprocable axially of said body and cutting off said conduit by and in response to pressure in said first chamber, and means urging said second valve to position placing said passageway and conduit in communication.

References Cited in the file of this patent

UNITED STATES PATENTS

| | | |
|---|---|---|
| 960,246 | Ashmore | June 7, 1910 |
| 1,078,061 | Polo | Nov. 11, 1913 |
| 1,151,044 | Relyea | Aug. 24, 1915 |
| 1,397,619 | Chard | Nov. 22, 1921 |
| 1,486,010 | Brown | Mar. 4, 1924 |
| 1,676,526 | Cox | July 10, 1928 |
| 1,878,411 | Lambert | Sept. 20, 1932 |